US012713360B2

(12) United States Patent
Steigert et al.

(10) Patent No.: US 12,713,360 B2
(45) Date of Patent: Aug. 18, 2026

(54) COMMUNICATION SYSTEM WITH TIME DIVISION DUPLEXING ACCESS POINT OPERATION IN QUASI FULL DUPLEX MODE

(71) Applicant: Outdoor Wireless Networks LLC, Claremont, NC (US)

(72) Inventors: Johannes Steigert, Harburg (DE); Thomas Kummetz, Kissing (DE)

(73) Assignee: Outdoor Wireless Networks LLC, Richardson, TX (US)

( * ) Notice: Subject to any disclaimer, the term of this patent is extended or adjusted under 35 U.S.C. 154(b) by 307 days.

(21) Appl. No.: 18/538,385

(22) Filed: Dec. 13, 2023

(65) Prior Publication Data

US 2024/0205839 A1 Jun. 20, 2024

Related U.S. Application Data

(60) Provisional application No. 63/476,212, filed on Dec. 20, 2022.

(51) Int. Cl.
*H04W 52/24* (2009.01)
*H04L 5/14* (2006.01)
*H04W 52/36* (2009.01)

(52) U.S. Cl.
CPC ............. *H04W 52/241* (2013.01); *H04L 5/14* (2013.01); *H04W 52/36* (2013.01)

(58) Field of Classification Search
CPC . H04W 52/241; H04W 52/36; H04W 52/243; H04L 5/14
USPC .................................................. 370/310, 311
See application file for complete search history.

(56) References Cited

U.S. PATENT DOCUMENTS 6,341,214 B2 * 1/2002 Uesugi ................ H04W 52/225 455/342
10,292,119 B2 5/2019 Kummetz et al.
2005/0075122 A1 * 4/2005 Lindoff ............... H04W 52/367 455/522
2007/0030915 A1 * 2/2007 Bhukania ................ H04L 27/22 375/280
2015/0249960 A1 * 9/2015 Huang ................ H04W 52/241 455/522
2018/0069685 A1 * 3/2018 Yang ..................... H04W 52/34

* cited by examiner

*Primary Examiner* — Obaidul Huq
(74) *Attorney, Agent, or Firm* — Fogg & Powers LLC

(57) ABSTRACT

A method of reducing interference in a time division duplexing access point during a quasi-full duplex mode in a communication system is provided. The method includes monitoring a signal quality of received signals from at least one user equipment (UE) at a base station. Transmission power used to a transmit signals from the base station is lowered when the monitored signal quality goes below a threshold. Full transmission power to transmit signals is restored once the signal quality of the received signals is above the threshold.

20 Claims, 9 Drawing Sheets

COMMUNICATION SYSTEM WITH TIME DIVISION DUPLEXING ACCESS POINT OPERATION IN QUASI FULL DUPLEX MODE

CROSS-REFERENCE TO RELATED APPLICATIONS

This application claims priority to U.S. Provisional Application Ser. No. 63/476,212, same title herewith, filed on Dec. 20, 2022, which is incorporated in its entirety herein by reference.

BACKGROUND

Time division duplexing (TDD) is a duplexing technique that employs a single frequency band for both uplink (UL) and downlink (DL) communication signals with the use of different timeslots. Transceivers for TDD systems require carefully designed protection mechanisms to avoid harming their UL receiver path circuits by the same radio frequency (RF) transmission of the high-power transmitter. A receiver front-end with its active stages that may include a low noise amplifier (LNA), filter, mixer, and analog to digital A/D-converter are typically designed for high sensitivity and may be permanently damaged if exposed to strong RF transmission signals without proper protection or cause the receiver to become desensitized during times of transmission.

Operation in either full-duplex mode or for a neutral host transceiver operated with multiple TDD channels, with each TDD channel on a different frequency with unsynchronized UL-DL switch points, traditionally requires self-interference cancellation (SIC) systems that cancels the transmit (Tx) signal in the receive (Rx) path.

Depending on the output power of the transmitter, the requirements of the SIC systems can exceed the total cancellation of 140-150 dB to prevent any desensitization of the Rx path. Although cancellation capabilities of 100 dB and more have been shown in experiments, it is questionable whether unconditional cancellation numbers of 140-150 dB are permanently achievable in multipath coupling conditions where the over-the-air coupling factors include highly dynamic changes due to coverage environments with moving objects.

Further, when user equipment (UE) (such as a mobile cellular device) is located at a relatively far distance from the base station, the output power needed for the Tx signal is increased. Errors due to small disturbances over a long-time duration of time may be seen in Rx signals at the base station due to interference caused by the increased power of the Tx signals. Traditionally, to overcome long-time disturbances, the Tx power of the base station is reduced at a moment of a known UL transmission from a UE. However, this makes it difficult for other UEs to receive signals from the base station because there is no power at that moment.

For the reasons stated above and for other reasons stated below which will become apparent to those skilled in the art upon reading and understanding the present specification, there is a need in the art for a system to mitigate desensitization of components in an Rx path while still allowing Tx signals to be received by other UEs.

SUMMARY

The following summary is made by way of example and not by way of limitation. It is merely provided to aid the reader in understanding some of the aspects of the subject matter described. Embodiments provide a communication system to mitigate desensitization of components in the Rx UL path by reducing interference in a time division duplexing access point during a quasi-full duplex mode while still allowing Tx signal to be received by other UEs.

In one example, a method of reducing interference in a time division duplexing access point during a quasi-full duplex mode in a communication system is provided. The method includes monitoring a signal quality of received signals from at least one UE at a base station; reducing a transmission power used to a transmit signals from the base station when a monitored signal quality goes below a threshold; and restoring a full transmission power to transmit signals once the signal quality of the received signals is above the threshold.

In another example, another method of reducing interference in a time division duplexing access point during a quasi-full duplex mode at an access point of base station of a radio access network (RAN) communication system. The method includes assigning a mobile network operator (MNO) to a plurality of resource blocks that form a subchannel from a plurality of subchannels that services a plurality of MNOs; associating each resource block with a range of a plurality of ranges, each range representing a distance range from a transceiver of the base station; arranging the resource blocks of the plurality of resource blocks within the subchannel so that resource blocks with associated nearer ranges are positioned near an edge of the subchannel; setting a transmission power for each resource block of the plurality of resource blocks based on an associated range of the resource block; and assigning communications with each UE of at least one UE that is communication with the MNO through the base station to a select resource block within the subchannel based on a location of the UE within a range of the plurality of ranges.

In another embodiment, an access point for a RAN communication system communicating with time division duplexing in a quasi-full duplex mode is provided. The communication system includes a Tx signal conditioner, at least one Rx signal monitoring element, and a controller. The Tx signal conditioner is configured to regulate a transmission signal power. The at least one Rx signal monitoring element configured to determine a condition of received uplink signals. The controller is in communication with the Tx signal conditioner and Rx signal monitoring element. The controller configured to: monitor a signal quality of received signals from at least one UE at a base station of the RAN through the Rx signal monitoring element; control the Tx signal conditioner to reduce a transmission power used to transmit signals from the base station when a monitored signal quality goes below a threshold; and restore a full transmission power to transmit signals once the signal quality of the received signal is above the threshold.

In yet another embodiment, another access point for a RAN communication system communicating with time division duplexing in a quasi-full duplex mode is provided. The communication system includes a Tx signal conditioner, at least one Rx signal monitoring element, and a controller. The Tx signal conditioner is configured to regulate a transmission signal power. The at least one Rx signal monitoring element is configured to determine a condition of received uplink signals. The controller is in communication with the Tx signal conditioner and Rx signal monitoring element. The controller is configured to: assign a mobile network operator (MNO) to a plurality of resource blocks that form a subchannel from a plurality of subchannels that services a plurality of MNOs; associate each resource block of the plurality of resource blocks with a range of a plurality of ranges, each range representing a distance range from a transceiver of a base station; position the resource blocks of the plurality of resource blocks within the subchannel so that resource blocks with associated closer ranges are positioned near an edge of the subchannel; set a transmission power for each resource block of the plurality of resource blocks based on an associated range of the resource block; and assign communications with each UE of the at least one UE to a select resource block within the subchannel based on a location of the UE within a range of the plurality of ranges.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a communication system to mitigate desensitization of components in the Rx UL path by reducing interference in a time division duplexing access point during a quasi-full duplex mode while still allowing Tx signals to be received by other UEs. In one example, the quality of Rx signals in the UL path is monitored. If a monitored quality of a Rx signal goes below a select signal quality threshold, the Tx power is at least reduced until the signal quality of the Rx signal is once again above the select signal quality threshold. In one example, the Tx power is fully muted while the signal quality of the Rx signal is below the select signal quality threshold. In another example, the Tx power is proportionally muted based on a then current quality of the Rx signal while the signal quality of the Rx signal is below the select signal quality threshold.

Further in an example where a communication system allows for different users to have different Tx output power, subchannels are used. Each subchannel includes frequency ranges or resource blocks (RBs). In this example, an intelligent RB management assigns communications between the base station and a UE for an operator based on the distance the UE is from a transceiver of the base station to a select RB in the subchannel. Since, UEs farther way from the transceiver of the base station require more power to reach the UEs than UEs closer to the transceiver of the base station, they are assigned to RBs near a middle of the subchannel while communications with UEs that are closer to the transceiver of the base station are assigned to RBs near an edge of the subchannel. This arrangement reduces interference into an adjacent subchannel serving another operator during an Rx mode. In an example, a distance to the transceiver of the base station is based on a monitored signal quality in an Rx signal. The distance may be a virtual distance. Also, distances may include UEs that are close to the base station due to fading influences but have high path losses. Further, the quality of a Rx signal going below a select signal quality threshold examples discussed above may be combined with the intelligent RB management example.

Figure 1:
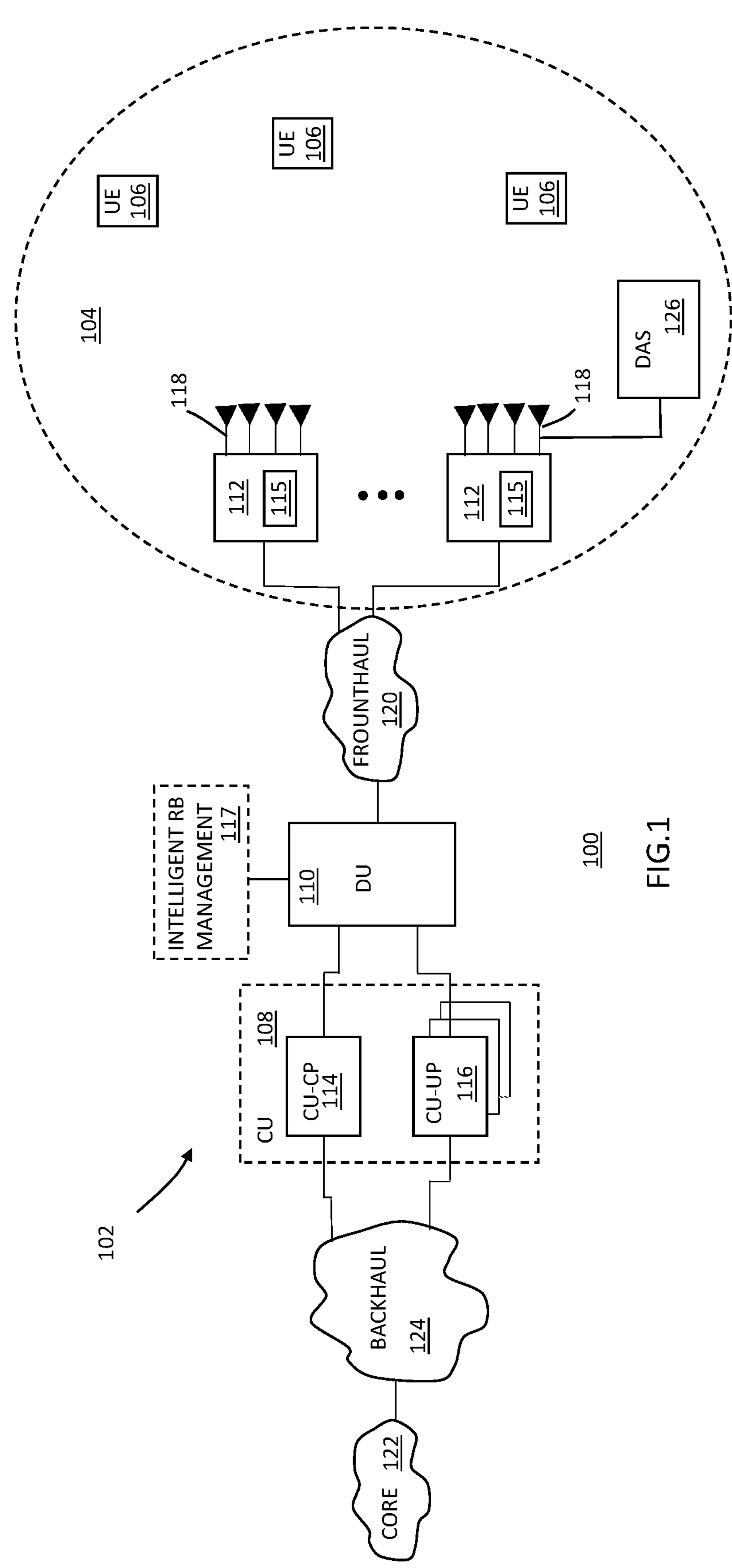
FIG. 1 is a block diagram of a radio access network communication system in which time division duplexing access point operation in quasi full duplex mode is implement according to an example aspect.

FIG. 1 is a block diagram illustrating one exemplary embodiment of a radio access network (RAN) communication system 100 in which time division duplexing access point operation in quasi full duplex mode may be implemented. The RAN system 100 shown in FIG. 1 implements at least one base station entity 102 to serve a cell 104. Each such base station entity 102 can also be referred to here as a "base station" or "base station system" (and, which in the context of a fourth generation (4G) Long Term Evolution (LTE) system, may also be referred to as an "evolved NodeB", "eNodeB", or "eNB" and, in the context of a fifth generation (5G) New Radio (NR) system, may also be referred to as a "gNodeB" or "gNB").

In general, each base station 102 is configured to provide wireless service to various items of user equipment (UEs) 106 served by the associated cell 104. Unless explicitly stated to the contrary, references to Layer 1, Layer 2, Layer 3, and other or equivalent layers (such as the Physical Layer or the Media Access Control (MAC) Layer) refer to layers of the particular wireless interface (for example, 4G LTE or 5G NR) used for wirelessly communicating with UEs 106. Furthermore, it is also to be understood that 5G NR embodiments can be used in both standalone and non-standalone modes (or other modes developed in the future) and the following description is not intended to be limited to any particular mode. Moreover, although some embodiments are described here as being implemented for use with 5G NR, other embodiments can be implemented for use with other wireless interfaces and the following description is not intended to be limited to any particular wireless interface.

In the specific exemplary embodiment shown in FIG. 1, each base station 102 is implemented as a respective 5G NR base station 102 (only one of which is shown in FIG. 1 for case of illustration). In this embodiment, each base station 102 is partitioned into one or more central unit entities (CUs) 108, one or more distributed unit entities (DUs) 110, and one or more radio units (RUs) 112. In such a configuration, each CU 108 implements Layer 3 and non-time critical Layer 2 functions for the base station 102. In the embodiment shown in FIG. 1, each CU 108 is further partitioned into one or more control-plane entities 114 and one or more user-plane entities 116 that handle the control-plane and user-plane processing of the CU 108, respectively. Each such control-plane CU entity 114 is also referred to as a "CU-CP" 114, and each such user-plane CU entity 116 is also referred to as a "CU-UP" 116. Also, in such a configuration, each DU 110 is configured to implement the time critical Layer 2 functions and, except as described below, at least some of the Layer 1 functions for the base station 102. In this example, each RU 112 is configured to implement the physical layer functions for the base station 102 that are not implemented in the DU 110 as well as the RF interface. Also, each RU 112 includes a respective set of one or more antenna ports 118 via which the RU 112 can be coupled to a set of antennas (not shown) via which DL analog RF signals can be radiated to UEs 106 and via which UL analog RF signals transmitted by UEs 106 can be received.

Each RU 112 is communicatively coupled to the DU 110 serving it via a fronthaul network 120. The fronthaul network 120 can be implemented using a switched Ethernet network, in which case each RU 112 and each physical node on which each DU 110 is implemented includes one or more Ethernet network interfaces to couple each RU 112 and each DU physical node to the fronthaul network 120 in order to facilitate communications between the DU 110 and the RUs 112. In one implementation, the fronthaul interface promulgated by the O-RAN Alliance is used for communication between the DU 110 and the RUs 112 over the fronthaul network 120. In another implementation, a proprietary fronthaul interface that uses a so-called "functional split 7-2" for at least some of the physical channels (for example, for the PDSCH and PUSCH) and a different functional split for at last some of the other physical channels (for example, using a functional split 6 for the PRACH and SRS).

In such an example, each CU 108 is configured to communicate with a core network 122 of the associated wireless operator using an appropriate backhaul network 124 (typically, a public wide area network such as the Internet).

Although FIG. 1 (and the description set forth below more generally) is described in the context of a 5G embodiment in which each logical base station entity 102 is partitioned into a CU 108, DUs 110, and RUs 112 and, for at least some of the physical channels, some physical-layer processing is performed in the DUs 110 with the remaining physical-layer processing being performed in the RUs 112, it is to be understood that the techniques described here can be used with other wireless interfaces (for example, 4G LTE) and with other ways of implementing a base station entity (for example, using a conventional baseband band unit (BBU)/remote radio head (RRH) architecture). Accordingly, references to a CU, DU, or RU in this description and associated figures can also be considered to refer more generally to any entity (including, for example, any "base station" or "RAN" entity) implementing any of the functions or features described here as being implemented by a CU, DU, or RU.

Each CU 108, DU 110, and RU 112, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.).

Moreover, each CU 108, DU 110, and RU 112, can be implemented as a physical network function (PNF) (for example, using dedicated physical programmable devices and other circuitry) and/or a virtual network function (VNF) (for example, using one or more general purpose servers (possibly with hardware acceleration) in a scalable cloud environment and in different locations within an operator's network (for example, in the operator's "edge cloud" or "central cloud"). Each VNF can be implemented using hardware virtualization, operating system virtualization (also referred to as containerization), and application virtualization as well as various combinations of two or more the preceding. Where containerization is used to implement a VNF, it may also be referred to as a "containerized network function" (CNF).

For example, in the exemplary embodiment shown in FIG. 1, each RU 112 is implemented as a PNF and is deployed in or near a physical location where radio coverage is to be provided and each CU 108 and DU 110 is implemented using a respective set of one or more VNFs deployed in a distributed manner within one or more clouds (for example, within an "edge" cloud or "central" cloud).

Each CU 108, DU 110, and RU 112, and any of the specific features described here as being implemented thereby, can be implemented in other ways.

In the exemplary embodiment shown in FIG. 1, a base station 102 may be coupled to a distributed antenna system (DAS) 126 to improve the wireless coverage provided by the base station 102. More specifically, in the exemplary embodiment shown in FIG. 1, an RU 112 of base station 102 is coupled to the DAS 126 using an analog RF interface. More specifically, the DAS 126 is coupled to the set of antenna ports 118 of the RU 112 that would otherwise be used to couple the RU 112 to a set of antennas. Although the exemplary embodiment shown in FIG. 1 uses an analog RF interface to couple each base station 102 of the DAS 126, it is to be understood that the base station 102 can be coupled to the DAS 126 in other ways. For example, a digital interface can be used between the DAS 126 and the base station 102 (for example, where a DU 110 of a base station 102 is coupled directly to the DAS 126).

Although in the exemplary embodiment shown in FIG. 1, each base station 102 is coupled to a DAS 126, it is to be understood that the techniques described below can be used with a base station 102 that is not connected to a DAS 126. For example, the techniques described below can also be a base station 102 that is not connected to a DAS 126 but is implemented using a so-called "non-ideal" fronthaul network 120. As used here, a "non-ideal" fronthaul network 120 is one that may not always be able to satisfy the minimum bandwidth and/or latency requirements for the base station that would otherwise be necessary if the techniques described below were not used.

The base station 102 in this embodiment further includes a Rx signal monitoring element 115. The Rx signal monitoring element 115, in an example, is used to determine Rx signal quality. In one example, the Rx signal monitoring element 115 is used to determine path loss in a communication from a UE which is used to set ranges for the intelligent RB management 117 discussed below. In one example, a Rx signal monitoring element 115 is located within each RU 112. In another embodiment at least one Rx signal monitoring element 115 is in another location within the base station 102. The Rx signal monitoring element 115 may further be in an element of the DAS 126 in an embodiment.

In one example, the Rx signal monitoring element 115 includes an analog to digital (A/D) converter and a field programable gate array (FPGA). In another example, the Rx signal monitoring element includes a RF detector that is integrated into an RF transceiver to conduct signal quality measurement inherently. Other examples may use analog circuits which detect abnormalities in a power spectral density to channel noise more upstream in the Rx chain within the base station 102. Further, desensitization in uplink receiving components may be determined in an example based on an output of the Rx signal monitoring element 115.

Further in an embodiment that allows different users to use different subchannel frequencies (or resource blocks (RBs)) where each RB may have a different output power, such as a fifth-generation new radio (5GNR) standard, an intelligent RB management 117 is used. The intelligent RB management 117 uses the base stations 102 knowledge of the path loss between the UE 106 and base station 102, which may be determined off outputs of the Rx signal monitoring elements 115, to classify the UEs 106 into different range classes which each can operate with ideally adapted output power as discussed in detail below. The intelligent RB management 117 may be implemented in different areas of the base station 102.

Figure 2:
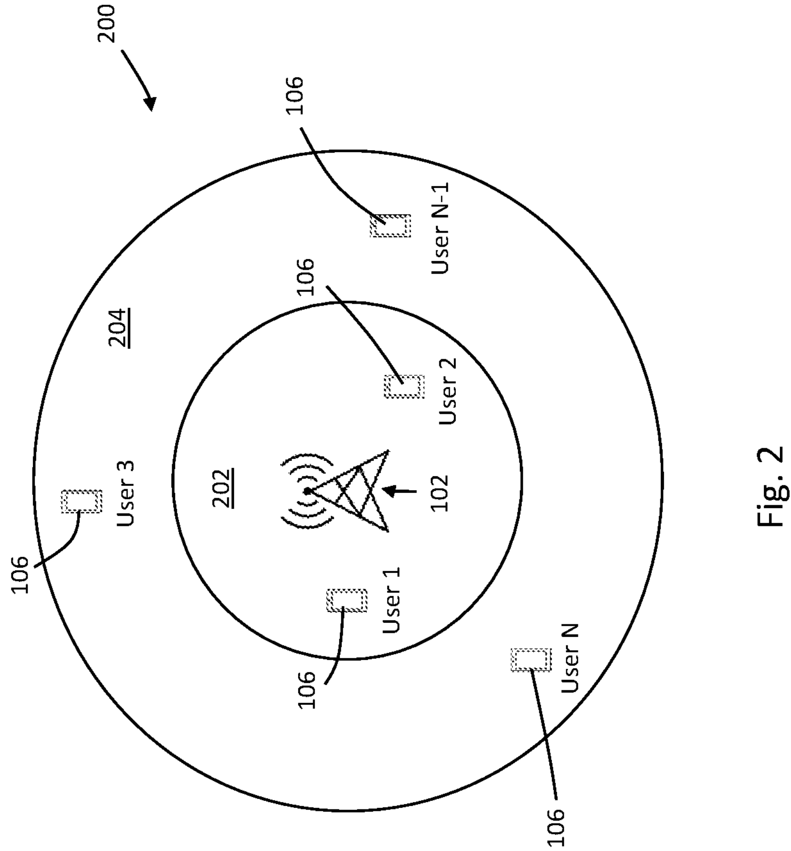
FIG. 2 illustrates a communication coverage area provided by a base station according to an example aspect.

FIG. 2 illustrates a communication coverage area 200 provided by a base station 102. The communication coverage area 200 includes two coverage areas, a near coverage area 202 and a far coverage area 204. Signal reception at the base station 102 from UEs 106 in the near coverage area 202 may use direct self-interference (SI) cancellation of a Tx signal in the Rx path.

For UEs 106 in the far coverage area, because of the output transmission power needed for the Tx signal, errors due to small disturbances over a long-time duration of time may be seen in Rx signals at the base station 102. This is because channel-related coupling mechanisms like fading, and delay spread in combination with reflections in direction of the base station 102 become dominant over the pure SI between transmitter and receiver. Traditionally, to overcome that long term disturbance by stopping the Tx power of the base station 102 at the moment of a known UL transmission from a UE 106. However, this makes it difficult for other UEs to receive signals from the base station 102 because there is no transmission power at that moment. Hence, this type of Tx muting may not be an option in most communication scenarios because it may lead to signal disruptions of several UE's 106 (i.e., a reduced base station coverage area), for the sake of enabling signal reception of one specific UE 106.

Figure 3:
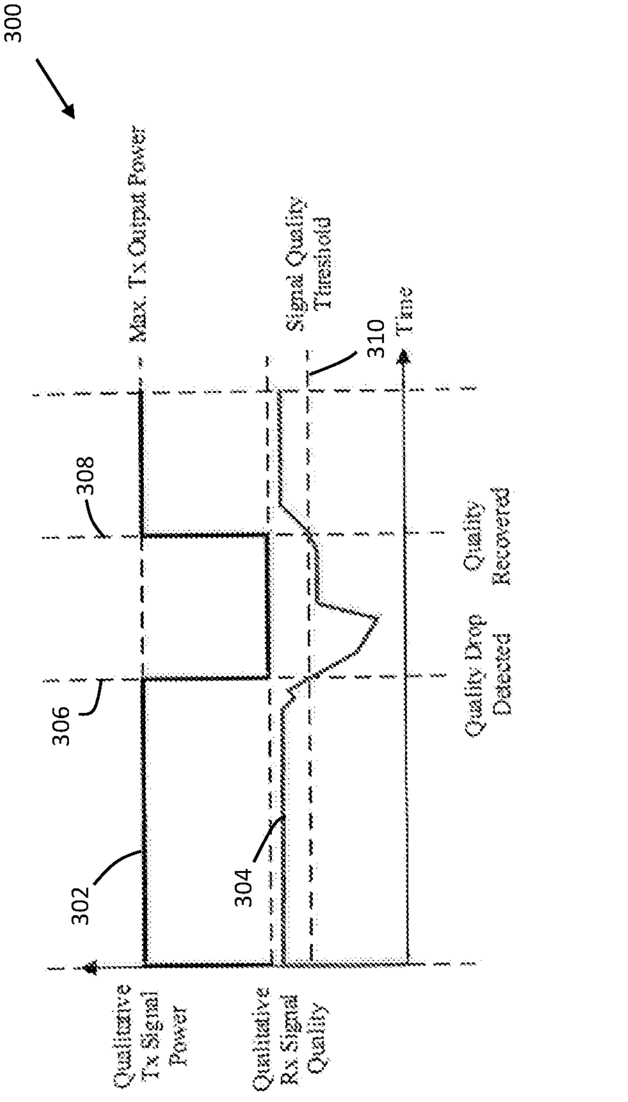
FIG. 3 illustrates a Tx muting graph showing Tx hard muting and its relation to the Rx signal quality according to an example aspect.

In one embodiment, a complete Tx signal is muted only for the time required to receive Rx signal frames suffering from the discussed desensitization. The embodiment eliminates the impact of short duration discontinuities of Rx signal quality in a way that only a negligible amount of Tx signal symbols is lost. An example of a time domain behavior of an exemplary Tx muting scenario is illustrated in the Tx hard muting graph 300 FIG. 3. In particular, the Tx hard muting graph 300 illustrates hard Tx muting and its relation to the Rx signal quality. A qualitative Tx signal power 302 is illustrated above a Rx signal quality 304 as a function of time. The qualitative Rx signal quality 304 is monitored over time. If the qualitative Rx signal quality 304 goes below a set threshold 310, the Tx power is fully muted. This occurs at a first switch point 306. The Tx power remains off only until the monitored qualitative Rx signal quality is measured above the signal quality threshold 310. This occurs at a second switch point 308. At the second switch point 308, the maximum Tx output power is restored.

Figure 4:
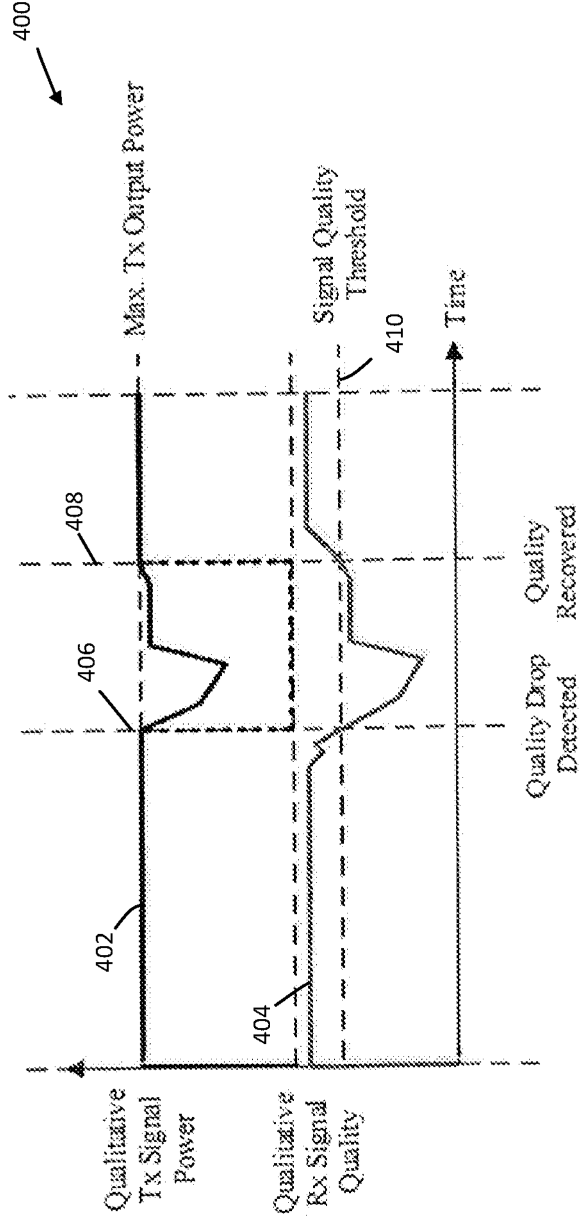
FIG. 4 illustrates a Tx soft muting graph showing TX soft muting and its relation to the Rx signal quality according to an example aspect.

Further, in another example embodiment, the Tx signal output power level is not a switched binary but is adjusted adaptively in dependence of the Rx signal quality so the impact on other UEs 106 and the base station coverage area 200 is further minimized. An example of a time domain behavior of this exemplary Tx muting scenario is illustrated in the Tx soft muting graph 400 of FIG. 4.

In particular, the Tx muting graph 400 illustrates a soft Tx muting and its relation to the Rx signal quality. A qualitative Tx signal power 402 is illustrated above a qualitative Rx signal quality 404 as a function of time. The qualitative Rx signal quality 404 is monitored over time. If the qualitative Rx signal quality 404 goes below a set threshold 410, the Tx power is dynamically adjusted based on the measured Rx signal quality at then current time. This occurs at a first switch point 406. The Tx power remains in the dynamically adjusting mode until the monitored qualitative Rx signal quality is measured above the signal quality threshold 310. This occurs at a second switch point 408. At the second switch point 408, the maximum Tx output power is restored.

Figure 5:
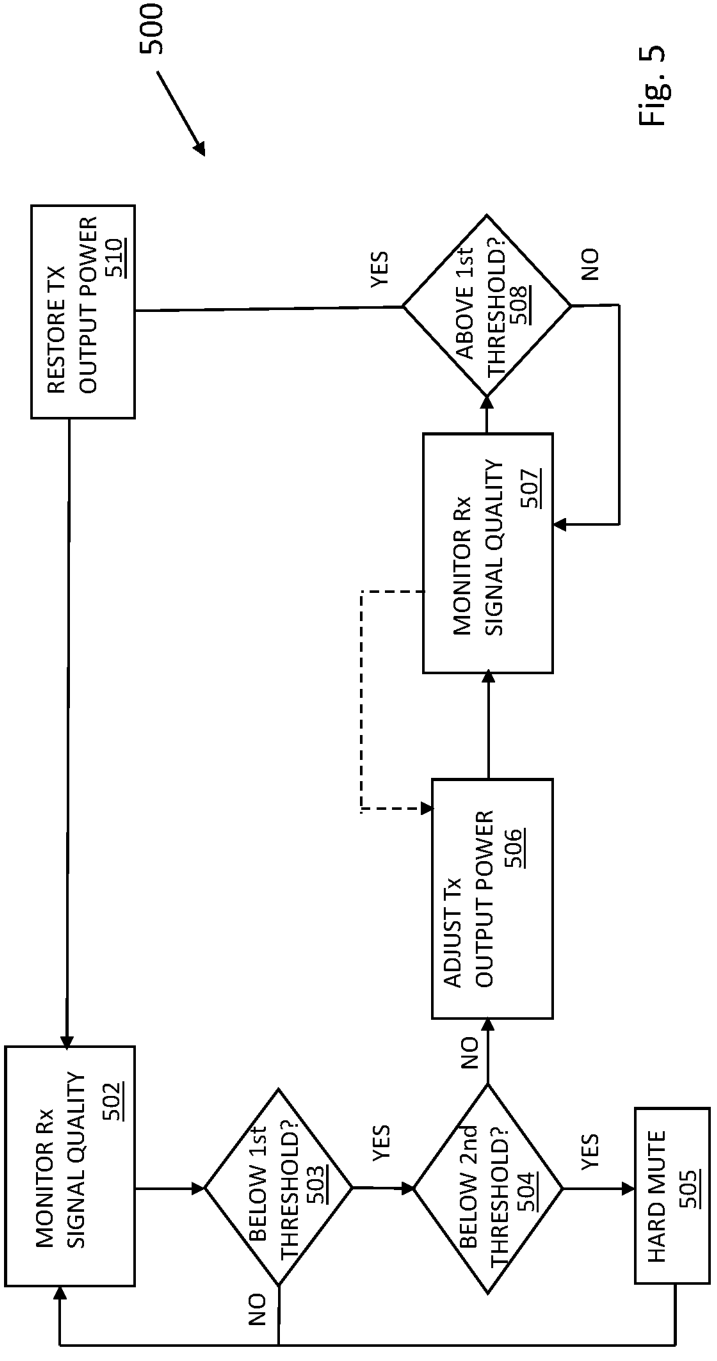
FIG. 5 illustrates a flow diagram of a method to control the desensitization effects of the Tx power on Rx components while minimizing the effects on Tx communications to other UEs according to an example aspect.

FIG. 5 illustrates a method 500 to control the desensitization effects of the Tx power on Rx components while minimizing the effects on Tx communications to other UEs 106 in view of the Tx hard muting graph 300 and the Tx soft muting graph 400 described above. Method 500 is provided as a series of blocks. The sequence of the blocks may occur in a different order or in parallel in other examples. Hence, the invention is not limited to the sequence set out in FIG. 5.

Method 500 starts at block 502 monitoring for Rx signal quality in received signals. As discussed above, this may be done with a Rx signal monitoring element 115. At block 503 it is determined if the Rx signal quality has fallen below a select first threshold. If the Rx signal quality has not fallen below a select first threshold, the process continues monitoring at block 502. If the Rx signal quality has fallen below the select first threshold, in this example, it is further determined if the Rx signal quality has fallen below a second threshold (a minimum threshold) at block 504. If it has been determined the Rx signal quality has fallen below the second threshold at block 504, hard muting of Tx signal occurs at block 505 and the process continues at block 502 monitoring the Rx signal quality. With Tx hard muting, the Tx power is fully muted.

If it has been determined the Rx signal quality has not fallen below the second threshold at block 504, the Tx output power is adjusted at block 506 via soft muting. With Tx soft muting the Tx power output is adjusted based on a then current measured Rx signal quality. Method 500 continues at block 507 monitoring Rx signal quality. In the Tx soft muting example, an output of the monitoring of the Rx signals quality at block 507 is provided back to block 506 so the adjustment of the Tx output power is dynamic (i.e., it is based on a then current Rx signal quality). It is determined at block 508 if the Rx signal quality is back above the select first threshold. If the Rx signal quality is not above the select first threshold, the process continues at block 507 monitoring the Rx signal quality. If the Rx signal quality is above the select first threshold at block 508, full Tx output power (full transmission power) is restored at block 510 and the process continues at block 502 monitoring the Rx signal quality.

In communication systems that allow for different users to have different Tx output power, an embodiment further minimizes the impact of muting the Tx output power on communication with UEs. For example, as discussed above, the fifth-generation new radio (5GNR) standard allows for signal configurations where different users use subchannels that may have different output power. Each subchannel includes frequency ranges or RBs. An example embodiment includes an intelligent RB management 117 that uses the base stations 102 knowledge of the path loss between UE 106 and base station 102 to classify the UEs 106 into different range classes which each can operate with ideally adapted output power. UE's 106 with low path loss allows the base station 102 to transmit at lower Tx power compared with UEs 106 suffering from a transmission channel with high path loss. A path lose may be determined with a Rx signal monitoring element 115 discussed above.

Figure 6:
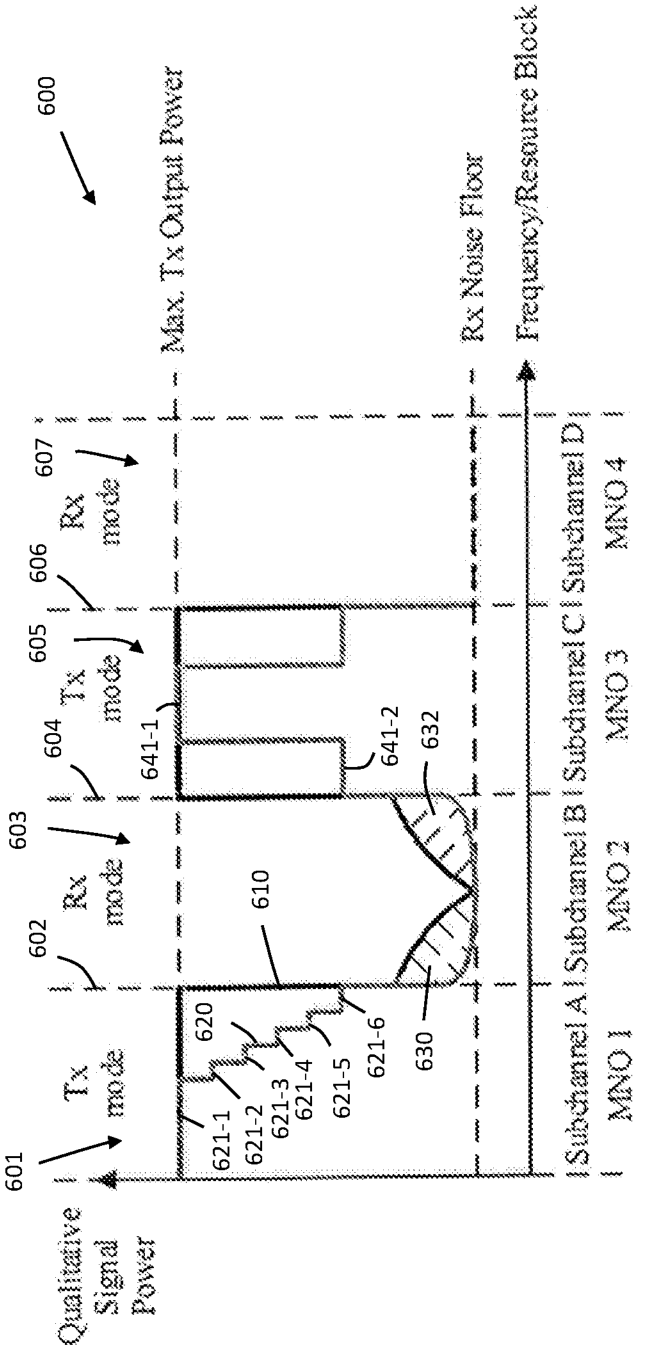
FIG. 6 illustrates a qualitative signal power verses resource block graph according to one example aspect.

The qualitative signal power verses resource block graph 600 of FIG. 6 illustrates a qualitative Tx signal power in conventional neutral host systems with independent channel edges 602, 604 and 606 (channel transitions) that separate subchannels with intelligent RB management in the frequency domain. As illustrated in FIG. 6, a conventional power signal 610 switches Tx power output only at the channel edges 602, 604 and 606 while the intelligent RB management 117 switches Tx power as needed in the adjusted power signal 620 as discussed below.

Subchannels 601, 603, 605 and 607 may be assigned to different mobile network operators (MNOs) which operate their channel in independent switching schemes (not displayed in the qualitative signal power verses resource block graph 600). A time vector would point into the image. Further subchannel dependent switching point are not shown in FIG. 6. In the example of FIG. 6, subchannel A 601 is assigned to MNO 1, subchannel B 603 is assigned to MNO 2, subchannel C 605 is assigned to MNO 3 and subchannel F 607 is assigned to MNO 4. Each subchannel 601, 603, 605 and 607 includes frequency ranges or RBs used in communications between the associated MNO and UEs serviced by the MNO.

In an example, the intelligent RB management 117 positions select RB near or next to edges of the subchannels to minimize potential interference with other subchannels as discussed below.

FIG. 6 also illustrates spectral efficiency in terms of leakage into adjacent subchannels which can be achieved by the intelligent RB management 117. Subchannel A 601 of MNO 1 divides its serviced UEs into six Tx power ranges 621-1 through 621-6 while subchannel C 605 of MNO 3 divides its UEs into two Tx power ranges 640-1 at full power and 641-2 at half power. In an example, the Tx power used to communicate with a specific UE depends on a distance between the base station 102 and the UE 106. For example, MNO 1 using subchannel A 601 would communicate Tx signals of power level 621-6 to UEs 106 in a nearest range, UEs in mid ranges using power levels 621-2 through 612-6, and in UEs in a farthest range at the highest power level 621-1. Similarly, MNO 3 assigned to subchannel C 605 would communication Tx signals of power level 641-2 to associated UEs in a near range and Tx signals of power level 641-1 to associated UEs 106 in a far range. Providing the plurality of Tx power levels, such as Tx power levels 621-1 through 621-6 provides a very smooth power adaption for the associated UEs 106 as they move from one range to another. In contrast, although subchannel C 605 (i.e., MNO 3) with only two range classes minimizes the computational complexity, the power adaption for that associated UEs 106 moving between ranges is less smooth compared to UEs 106 moving between different ranges in the associated subchannel A 601 where the Tx power is set to be the lowest nearer (or next to) the subchannel edge (subchannel transition) and the highest at a middle point with the power ascending from the edge to the mid-point. In practice, there may be small guard bands between the subchannels (i.e., unused RBs).

FIG. 6 further illustrates channel leakage 630 from Tx signals in subchannel A 601 and channel leakage 632 from Tx signals in subchannel C 605 each leaking into adjacent subchannel B 603 that is in an Rx mode. However, in embodiments, by the assigning the TX power strength to be the lowest near the edge of the subchannel, the amount of channel leakage 630 (which is caused by subchannel transition 601) in the adjacent channel can be minimized. Further with a neutral host base station 102 with unsynchronized Tx/Rx channel transitions 602, 604, 606 between MNOs, high requirements for SIC cancellation can be somewhat relaxed if the resource blocks with low path loss (associated with near ranges) are allocated close to the subchannel edge and accordingly limited in output power.

Figure 7:
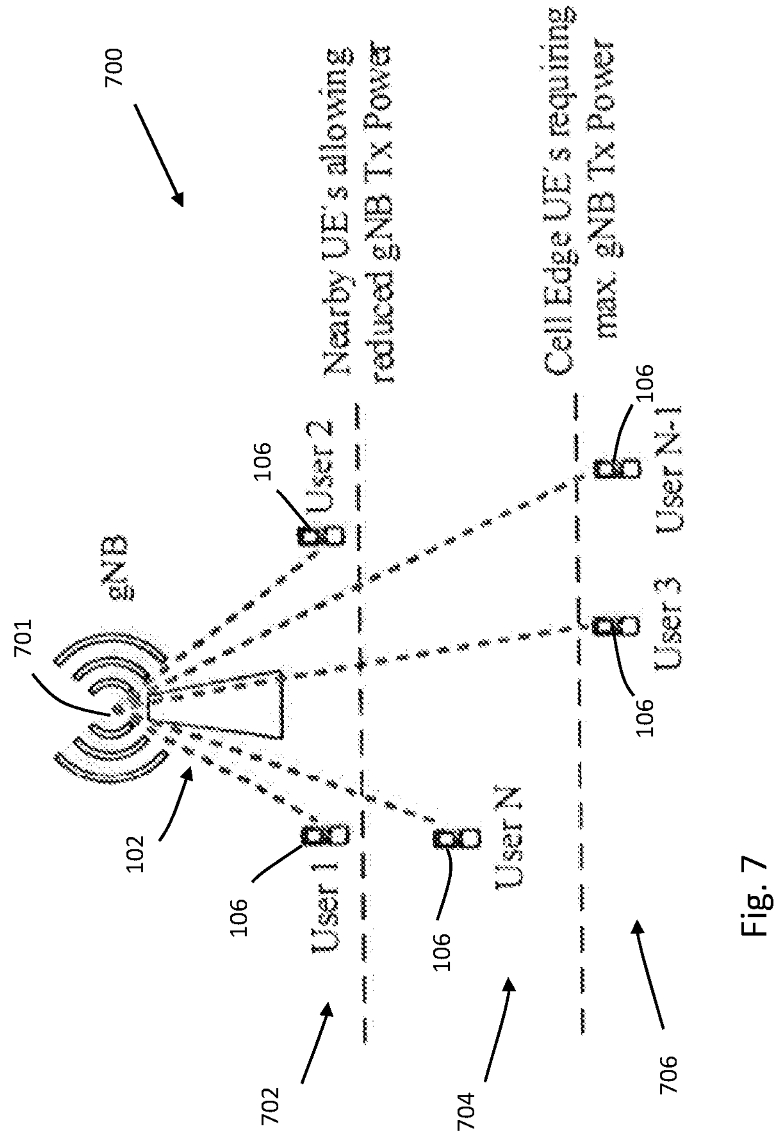
FIG. 7 illustrates another communication coverage area provided by a base station according to an example aspect.

An example of range classifying UEs 106 communicating with an MNO through a base station 102 is illustrated in the communication coverage area 700 provided by base station 102 of FIG. 7. The cover area 700 is separated into ranges. A range is a distance range from a transceiver 701 of the base station through a portion of the coverage area. In the example of FIG. 7, UEs 106 associated with a first user and a second user are classified in a first range 702. A UE associated with user N is classified in a second range 704 and UEs 106 associated with a third user and user n−1 are classified in a third range 706. The UEs 106 in the first range 702 are considered nearby UEs 106. They may use reduced base station Tx power. The UEs 106 in the third range 706, which is the farthest away range near the cell 104 edge, may require maximum Tx power while the UEs in the mid or second range would require a mid-level power. In examples, the intelligent RB management 117 would set out the Tx power used based on the location of the associated UEs 106 within a range.

Figure 8:
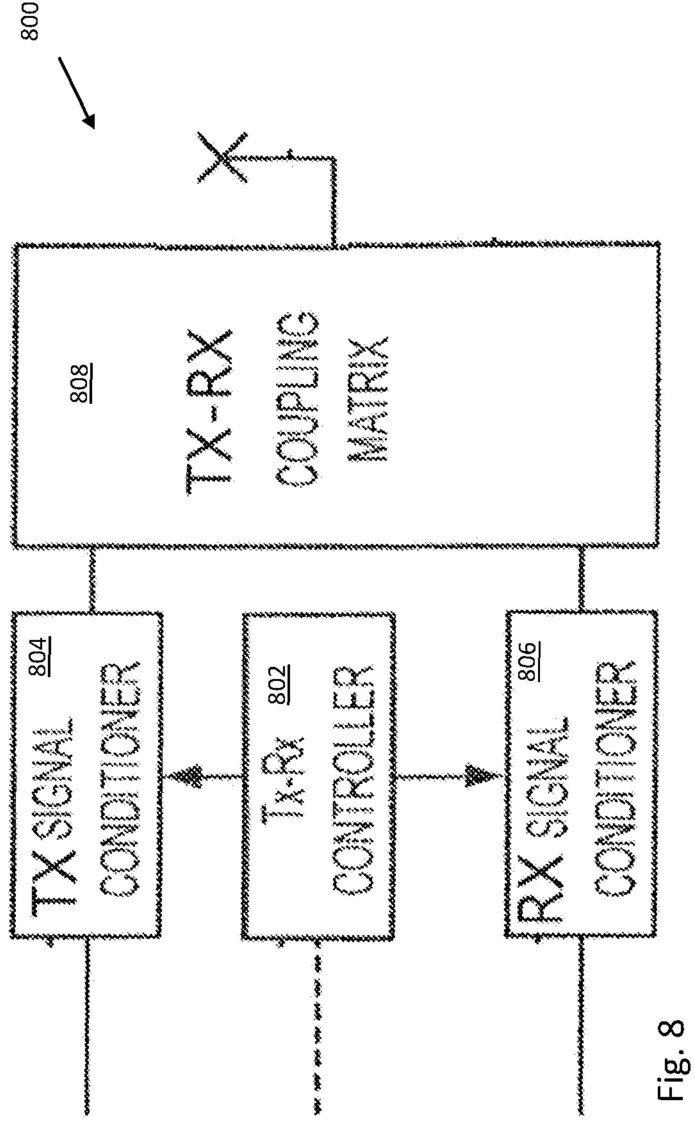
FIG. 8 illustrates a block diagram of an example control system that is located within components of a RAN system according to an example aspect.

FIG. 8 illustrates a block diagram of an example control system 800 that is located within components of the RAN system 100. The control system 800 is used to reduce interference between Tx signals and Rx signals with TDD.

The control system 800 includes a Tx/Rx controller 802 as well as signal conditioners 804 and 806 and an Tx/Rx coupling matrix 808 in this example embodiment. The Tx/Rx controller 802, which can generally be referred to as a controller 802, includes a processor and may be in a centralized unit (i.e., the core network 122) or another location in the RAN system 100. The controller, in an example, implements instructions for interference reduction techniques including the intelligent RB management 117 discussed above that may be stored in a memory in the core network, cloud or other location within the RAN system 100 using Rx signal quality information obtained by one or more Rx signal monitoring elements 115.

The Tx/Rx coupling matrix 808 represents the physical coupling between Tx and Rx and may consist of couplers, circulators, separate antennas and/or the related over-the-air coupling due to obstacles. Further the Tx and Rx signal conditioners 804 and 806 may be part of a remote unit 112, the core network 122 or any other stage of the RAN system 100. The Tx and Rx signals conditioners 804 and 806, controlled by the controller 802, provides power reduction or muting based on the interference reduction techniques. In one example, the Rx signal monitoring element 115 is located within the Rx signal conditioner 806 and is used to monitor the condition of the uplink signal. Further in an embodiment, the Tx signal conditioner regulates the transmission signal power.

Figure 9:
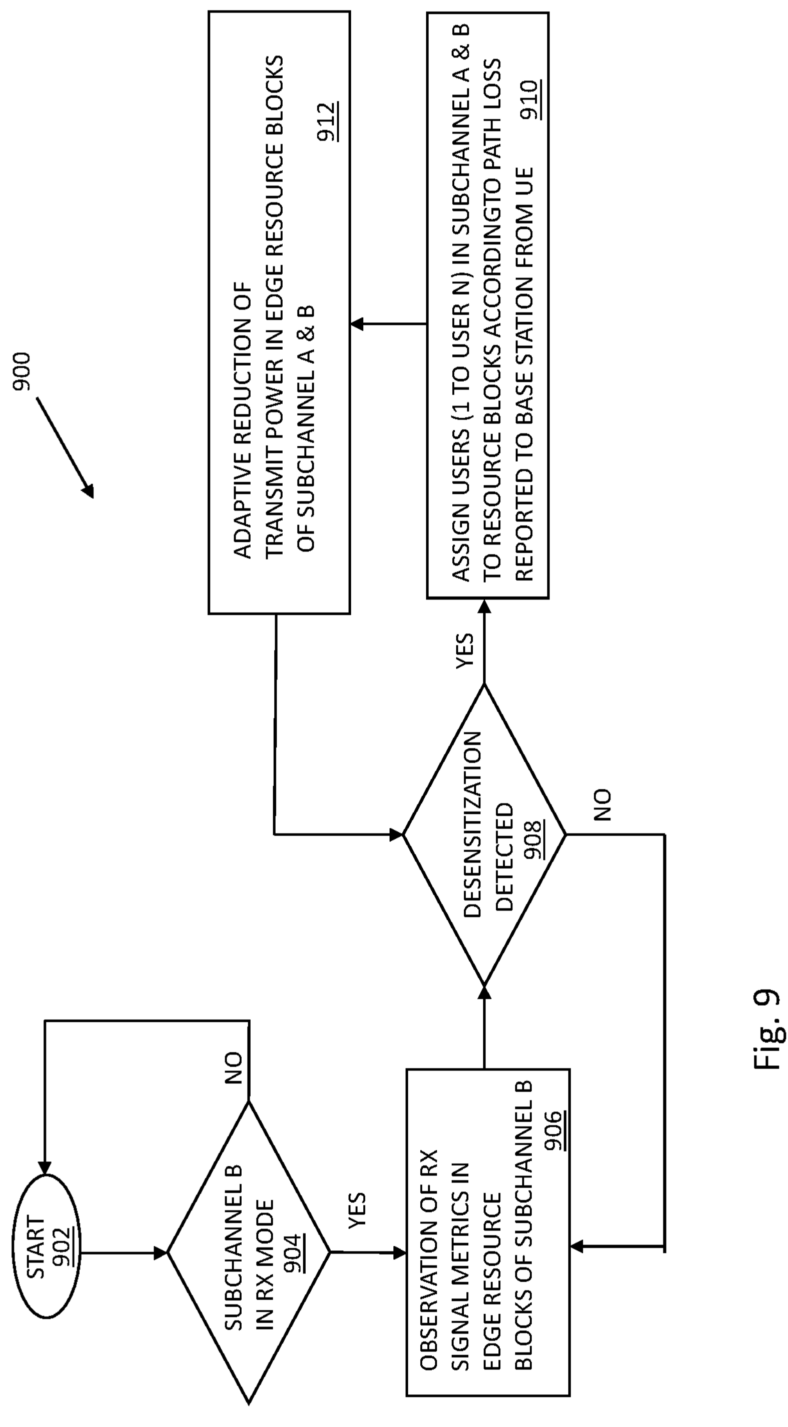
FIG. 9 illustrates a flow diagram of an example method of implementing an intelligent RB management using controller according to an example aspect.

FIG. 9 illustrates a flow diagram of an example method 900 to implement an intelligent RB management 117 using controller 802. The method 900 is provided as a series of blocks that set an example where intelligent RB management as discussed above is available. The sequence of the blocks may occur in a different or in parallel in other examples. Hence, the invention is not limited to the sequence set out in FIG. 9.

Example method 900 starts at block 902. It is determined at block 904 if subchannel B 603 is in a Rx mode. If subchannel B 603 is not in a Rx mode, the process continues at the start at block 902. If, however, it is determined at block 904 that the subchannel B 603 is in a Rx mode, Rx signal metrics in edge resource blocks of subchannel B 603 from received uplink signals are observed at block 906. In an example, this is done with controller 802 using one Rx signal monitoring elements 115.

It is then determined at block 908 if desensitization is detected. If desensitization is not detected (or no longer detected), the process continues at block 906 observing Rx signal metrics. If desensitization is detected at block 908, the users (users 1 to user n) are assigned to RB according to path loss reported to a base station 102 from a UE 106 at block 910. As discussed above, the path loss is related to the range between the base station 102 and UE. An adaptive reduction of transmit power in the edge RB of subchannel A 601 and C 605 occurs at block 912 to minimize interference in subchannel B 603. The process continues at block 908.

Example Embodiments

Example 1 includes a method of reducing interference in a time division duplexing access point during a quasi-full duplex mode in a communication system. The method includes monitoring a signal quality of received signals from at least one UE at a base station; reducing a transmission power used to a transmit signals from the base station when a monitored signal quality goes below a threshold; and restoring a full transmission power to transmit signals once the signal quality of the received signals is above the threshold.

Example 2 include the method of Example 1, wherein reducing the transmission power includes fully muting the transmission power.

Example 3 includes the method of Example 1, wherein reducing transmission power includes muting the transmission power based on a then current monitored signal quality of the received signals.

Example 4 includes the method of any of the Examples 1-3, further including determining if desensitization is detected in uplink receiver components based on the monitored signal quality in the received signals.

Example 5 includes the method of any of the Examples 1-3, wherein the signal quality provides at least one of path loss information and desensitization of uplink receiver components information.

Example 5 includes the method of any of the Examples 1-5, further including assigning a MNO to a plurality of resource blocks that form a subchannel from a plurality of subchannels that services a plurality of MNOs; associating each resource block of the plurality of resource blocks with a range of a plurality of ranges, each range representing a distance range from a transceiver of the base station; arranging the resource blocks of the plurality of resource blocks within the subchannel such that resource blocks with associated nearer ranges are positioned near an edge of the subchannel; setting a transmission power for each resource block of the plurality of resource blocks based on an associated range of the resource block; and assigning communications with each UE of the at least one UE to a select resource block within the subchannel based on a location of the UE within a range of the plurality of ranges.

Example 7 includes the method of the Example 6, wherein the location of each UE of the at least one UE is determined by an associated signal quality of a received signal from the UE.

Example 8 includes the method of any of the Examples 6-7, further including positioning at least one resource block associated with a farthest range in a middle position of the plurality of resource blocks within the subchannel.

Example 9, includes the method of Example 8, wherein the arranging of the resource blocks of the plurality of resource blocks within the subchannel so that the resource blocks with associated nearer ranges are positioned near an edge of the subchannel further includes positioning resource blocks of the plurality of resource blocks associated with the nearer ranges next to each edge of the subchannel; and positioning remaining resource blocks of the plurality of resource blocks between the resource blocks associated with the nearer ranges and the at least one resource with the farthest range in an ascending order.

Example 10 includes a method of reducing interference in a time division duplexing access point during a quasi-full duplex mode at an access point of base station of a RAN communication system. The method includes assigning a MNO to a plurality of resource blocks that form a subchannel from a plurality of subchannels that services a plurality of MNOs; associating each resource block with a range of a plurality of ranges, each range representing a distance range from a transceiver of the base station; arranging the resource blocks of the plurality of resource blocks within the subchannel so that resource blocks with associated nearer ranges are positioned near an edge of the subchannel; setting a transmission power for each resource block of the plurality of resource blocks based on an associated range of the resource block; and assigning communications with each UE of at least one UE that is communication with the MNO through the base station to a select resource block within the subchannel based on a location of the UE within a range of the plurality of ranges.

Example 11 includes the method of Example 10, wherein the location of each UE of the at least one UE is determined by an associated signal quality of a received signal from the UE.

Example 12 includes the method of any of the Examples 10-11, further including positioning at least one resource block with a farthest range in a middle position of the plurality of resource blocks within the subchannel.

Example 13 includes the method of Examples 12, wherein the arranging of the resource blocks of the plurality of resource blocks within the subchannel so that the resource blocks with associated closer ranges are positioned near an edge of the subchannel further includes positioning resource blocks of the plurality of resource blocks associated with nearest ranges next to each edge of the subchannel; and positioning remaining resource blocks of the plurality of resource blocks between the resource blocks associated with the nearer ranges and the at least one resource with the farthest range in an ascending order.

Example 14 includes the method of any of the Examples 10-13, further including wherein assigning communications with each UE of the at least one UE that is communication with the MNO through the base station to a select resource block within the subchannel based on a location of the UE within the ranges further including monitoring a Rx signal quality from communication signals received from each UE; and associating each UE to an associated range based on the monitored Rx signal quality.

Example 15 includes the method of Example 14, further including determining if a desensitization is detected in receive (Rx) components based on the monitoring of the RX signal quality from communication signals received from each UE; and setting the transmission power for each resource block based on an associated range when desensitization is detected.

Example 16 includes the method of Example 15, further including setting the transmission power for each resource block based on full power when the desensitization is no longer detected.

Example 17 includes an access point for a RAN communication system communicating with time division duplexing in a quasi-full duplex mode. The communication system including a Tx signal conditioner, at least one Rx signal monitoring element, and a controller. The Tx signal conditioner is configured to regulate a transmission signal power. The at least one Rx signal monitoring element configured to determine a condition of received uplink signals. The controller is in communication with the Tx signal conditioner and Rx signal monitoring element. The controller configured to: monitor a signal quality of received signals from at least one UE at a base station of the RAN through the Rx signal monitoring element; control the Tx signal conditioner to reduce a transmission power used to transmit signals from the base station when a monitored signal quality goes below a threshold; and restore a full transmission power to transmit signals once the signal quality of the received signal is above the threshold.

Example 18 includes the communication system of Example 17, wherein reducing transmission power includes one of fully muting the transmission power and muting the transmission power is based on a then current monitored signal quality of the received signals.

Example 19 includes an access point for a RAN communication system communicating with time division duplexing in a quasi-full duplex mode, the communication system including a Tx signal conditioner, at least one Rx signal monitoring element, and a controller. The Tx signal conditioner is configured to regulate a transmission signal power. The at least one Rx signal monitoring element is configured to determine a condition of received uplink signals. The controller is in communication with the Tx signal conditioner and Rx signal monitoring element. The controller is configured to: assign a mobile network operator (MNO) to a plurality of resource blocks that form a subchannel from a plurality of subchannels that services a plurality of MNOs; associate each resource block of the plurality of resource blocks with a range of a plurality of ranges, each range representing a distance range from a transceiver of a base station; position the resource blocks of the plurality of resource blocks within the subchannel so that resource blocks with associated closer ranges are positioned near an edge of the subchannel; set a transmission power for each resource block of the plurality of resource blocks based on an associated range of the resource block; and assign communications with each UE of the at least one UE to a select resource block within the subchannel based on a location of the UE within a range of the plurality of ranges.

Example 20 includes the communication system of Example 19, wherein the controller is further configured to determine the location of the UE by an associated signal quality of a received signal from the UE; and set a transmission power for each resource block of the plurality of resource blocks based on an associated range of the resource block upon detection of desensitization in uplink receiver components.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of reducing interference in a time division duplexing access point during a quasi-full duplex mode in a communication system, the method comprising:

monitoring a plurality of subchannels for a signal quality of received signals from at least one user equipment (UE) at a base station;

reducing a transmission power used to a transmit signals from the base station in at least one subchannel of the plurality of subchannels when at least a monitored signal quality goes below a threshold in an associated subchannel while the transmission power used in at least one other subchannel of the plurality of subchannels is not reduced; and restoring a full transmission power to transmit signals in the at least one subchannel associated with the monitored signal quality below the threshold once the signal quality of the received signals is above the threshold.

2. The method of claim 1, wherein reducing the transmission power includes fully muting the transmission power.

3. The method of claim 1, wherein reducing transmission power includes muting the transmission power based on a then current monitored signal quality of the received signals.

4. The method of claim 1, further comprising:

determining if desensitization is detected in uplink receiver components based on the monitored signal quality in the received signals.

5. The method of claim 1, wherein the signal quality provides at least one of path loss information and desensitization of uplink receiver components information.

6. The method of claim 1, further comprising:

assigning a mobile network operator (MNO) to a plurality of resource blocks that form a subchannel from the plurality of subchannels that services a plurality of MNOs;

associating each resource block of the plurality of resource blocks with a range of a plurality of ranges, each range representing a distance range from a transceiver of the base station;

arranging the resource blocks of the plurality of resource blocks within the subchannel such that resource blocks with associated nearer ranges are positioned near an edge of the subchannel;

setting a transmission power for each resource block of the plurality of resource blocks based on an associated range of the resource block; and assigning communications with each UE of the at least one UE to a select resource block within the subchannel based on a location of the UE within a range of the plurality of ranges.

7. The method of claim 6, wherein the location of each UE of the at least one UE is determined by an associated signal quality of a received signal from the UE.

8. The method of claim 6, further comprising:

positioning at least one resource block associated with a farthest range in a middle position of the plurality of resource blocks within the subchannel.

9. The method of claim 8, wherein the arranging of the resource blocks of the plurality of resource blocks within the subchannel so that the resource blocks with associated nearer ranges are positioned near an edge of the subchannel further comprises:

positioning resource blocks of the plurality of resource blocks associated with the nearer ranges next to each edge of the subchannel; and positioning remaining resource blocks of the plurality of resource blocks between the resource blocks associated with the nearer ranges and the at least one resource with the farthest range in an ascending order.

10. A method of reducing interference in a time division duplexing access point during a quasi-full duplex mode at an access point of base station of a radio access network (RAN) communication system, the method comprising:

assigning a mobile network operator (MNO) to a plurality of resource blocks that form a subchannel from a plurality of subchannels that services a plurality of MNOs;

associating each resource block with a range of a plurality of ranges, each range representing a distance range from a transceiver of the base station;

arranging the resource blocks of the plurality of resource blocks within the subchannel so that resource blocks with associated nearer ranges are positioned near an edge of the subchannel;

setting a transmission power for each resource block of the plurality of resource blocks based on an associated range of the resource block; and assigning communications with each user equipment (UE) of at least one UE that is communication with the MNO through the base station to a select resource block within the subchannel based on a location of the UE within a range of the plurality of ranges.

11. The method of claim 10, wherein the location of each UE of the at least one UE is determined by an associated signal quality of a received signal from the UE.

12. The method of claim 10, further comprising:

positioning at least one resource block with a farthest range in a middle position of the plurality of resource blocks within the subchannel.

13. The method of claim 12, wherein the arranging of the resource blocks of the plurality of resource blocks within the subchannel so that the resource blocks with associated closer ranges are positioned near an edge of the subchannel further comprises:

positioning resource blocks of the plurality of resource blocks associated with nearest ranges next to each edge of the subchannel; and positioning remaining resource blocks of the plurality of resource blocks between the resource blocks associated with the nearer ranges and the at least one resource with the farthest range in an ascending order.

14. The method of claim 10, wherein assigning communications with each UE of the at least one UE that is communication with the MNO through the base station to a select resource block within the subchannel based on a location of the UE within the ranges further comprises:

monitoring a Rx signal quality from communication signals received from each UE; and associating each UE to an associated range based on the monitored Rx signal quality.

15. The method of claim 14, further comprising:

determining if a desensitization is detected in receive (Rx) components based on the monitoring of the RX signal quality from communication signals received from each UE; and setting the transmission power for each resource block based on an associated range when desensitization is detected.

16. The method of claim 15, further comprising:

setting the transmission power for each resource block based on full power when the desensitization is no longer detected.

17. An access point for a radio access network (RAN) communication system communicating with time division duplexing in a quasi-full duplex mode, the communication system comprising:

a transmission (Tx) signal conditioner configured to regulate a transmission signal power;

at least one receive (Rx) signal monitoring element configured to determine a condition of received uplink signals in a plurality of subchannels; and a controller in communication with the Tx signal conditioner and Rx signal monitoring element, the controller configured to:

monitor a signal quality of received signals from at least one user equipment (UE) at a base station of the RAN through the Rx signal monitoring element;

control the Tx signal conditioner to reduce a transmission power used to transmit signals from the base station when at least a monitored signal quality goes below a threshold in an associated subchannel while the transmission power used in at least one other subchannel of the plurality of subchannels is not reduced; and restore a full transmission power to transmit signals once the signal quality of the received signal in the associated subchannel is above the threshold.

18. The communication system of claim 17, wherein reducing transmission power includes one of fully muting the transmission power and muting the transmission power based on a then current monitored signal quality of the received signals.

19. An access point for a radio access network (RAN) communication system communicating with time division duplexing in a quasi-full duplex mode, the communication system comprising:
- a transmission (Tx) signal conditioner configured to regulate a transmission signal power;
- at least one receive (Rx) signal monitoring element configured to determine a condition of received uplink signals; and
- a controller in communication with the Tx signal conditioner and Rx signal monitoring element, the controller configured to:
  - assign a mobile network operator (MNO) to a plurality of resource blocks that form a subchannel from a plurality of subchannels that services a plurality of MNOs;
  - associate each resource block of the plurality of resource blocks with a range of a plurality of ranges, each range representing a distance range from a transceiver of a base station;
  - position the resource blocks of the plurality of resource blocks within the subchannel so that resource blocks with associated closer ranges are positioned near an edge of the subchannel;
  - set a transmission power for each resource block of the plurality of resource blocks based on an associated range of the resource block; and
  - assign communications with each UE of the at least one UE to a select resource block within the subchannel based on a location of the UE within a range of the plurality of ranges.

20. The communication system of claim 19, wherein the controller is further configured to,
- determine the location of the UE by an associated signal quality of a received signal from the UE; and
- set a transmission power for each resource block of the plurality of resource blocks based on an associated range of the resource block upon detection of desensitization in uplink receiver components.

* * * * *